United States Patent [19]

Iwasawa et al.

[11] Patent Number: 5,039,291
[45] Date of Patent: Aug. 13, 1991

[54] FOAM MOLDING ASSEMBLY

[75] Inventors: Toshio Iwasawa, Kanagawa; Takeo Yoshida, Yokohama; Junji Sakata, Fujisawa; Kazushige Ebe, Yokohama; Itsumi Komada; Toshihiro Hamaji, both of Nabari; Akihito Kimura, Nara, all of Japan

[73] Assignee: Bridgestone Corporation, Tokyo, Japan

[21] Appl. No.: 444,342

[22] Filed: Dec. 1, 1989

Related U.S. Application Data

[62] Division of Ser. No. 347,135, May 4, 1989, abandoned.

[30] Foreign Application Priority Data

| May 7, 1988 | [JP] | Japan | 63-109872 |
| Jun. 16, 1988 | [JP] | Japan | 63-146945 |
| Jun. 23, 1988 | [JP] | Japan | 63-153655 |
| Feb. 8, 1989 | [JP] | Japan | 1-27580 |
| Feb. 8, 1989 | [JP] | Japan | 1-27581 |

[51] Int. Cl.$^5$ .................................... B29C 39/26
[52] U.S. Cl. ............................ 425/4 R; 249/63; 249/141; 249/171; 249/177; 425/577; 425/812; 425/817 R
[58] Field of Search .......... 249/170, 171, 172, 175, 249/177, 63; 425/4 R, 817 R, 577, 546, 420, 812, 117, 125; 246/46.4, 46.6, 46.8

[56] References Cited

U.S. PATENT DOCUMENTS

| 3,302,244 | 2/1967 | Ludwig | 249/170 |
| 3,327,029 | 6/1967 | Pincus et al. | 264/46.8 |
| 3,408,695 | 11/1968 | Scott | 249/170 |
| 4,247,351 | 1/1981 | Richenberg | 264/46.6 |
| 4,793,793 | 12/1988 | Swenson et al. | 264/46.8 |

FOREIGN PATENT DOCUMENTS

| 851017 | 10/1960 | United Kingdom | 249/171 |
| 2190621 | 11/1987 | United Kingdom | |

Primary Examiner—Jay H. Woo
Assistant Examiner—Khanh P. Nguyen
Attorney, Agent, or Firm—Sughrue, Mion, Zinn, Macpeak & Seas

[57] ABSTRACT

Molding a foamed product is carried out by using a front and a rear mold for molding a front and a rear portion of the foamed product and a core interposed between the front and rear molds. The front and rear molds are closed at a moment when a lapse of time arrives at 30%–100% of a rise time of the foaming stock solution later applied. Thereafter the closed molds are maintained in a position where an angle of the closed molds relative to a horizontal plane is within a range between 90° and an angle more than 0°. The front and rear molds are pivotally connected to each other with their one ends by means of a pivot shaft. The core is pivotally supported with its one end by a shaft arranged in parallel to the pivot shaft. The core is formed with a through-hole and said rear mold is provided with a protrusion to be hermetically fitted in the through-hole of the core.

7 Claims, 19 Drawing Sheets

FIG_1
PRIOR ART
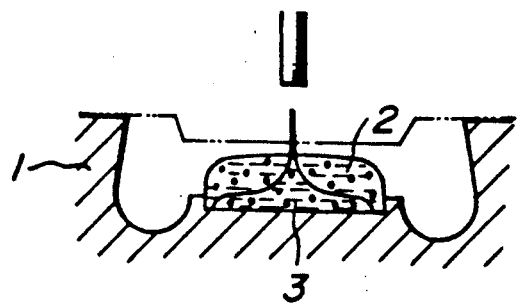
FIG_2
PRIOR ART
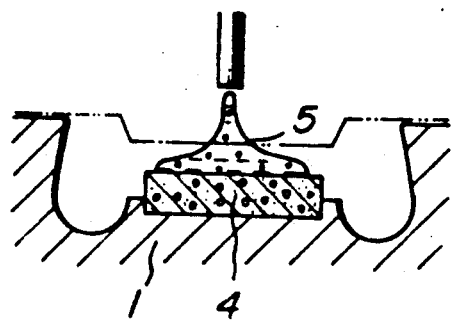

FIG._13

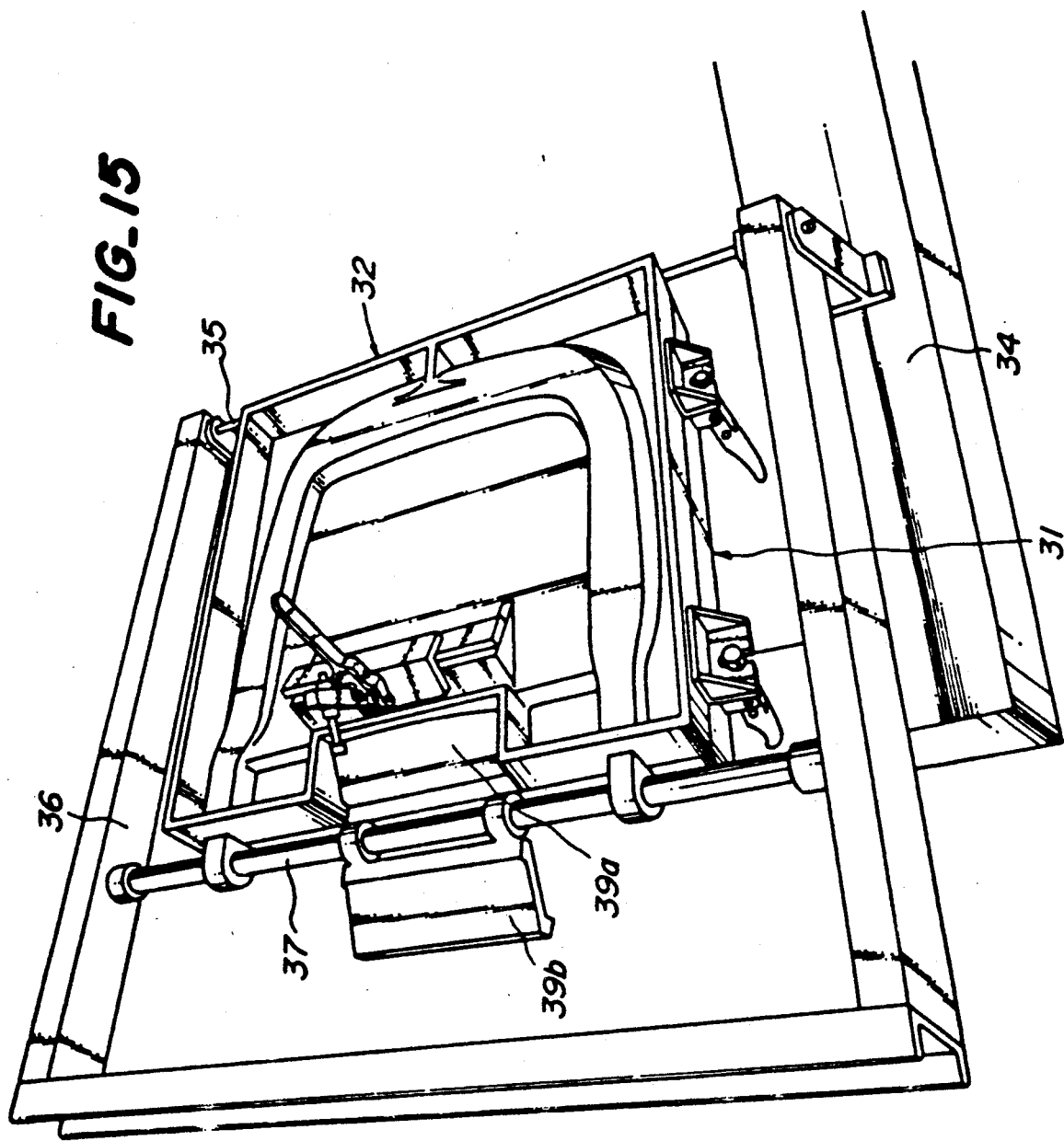

FIG_20
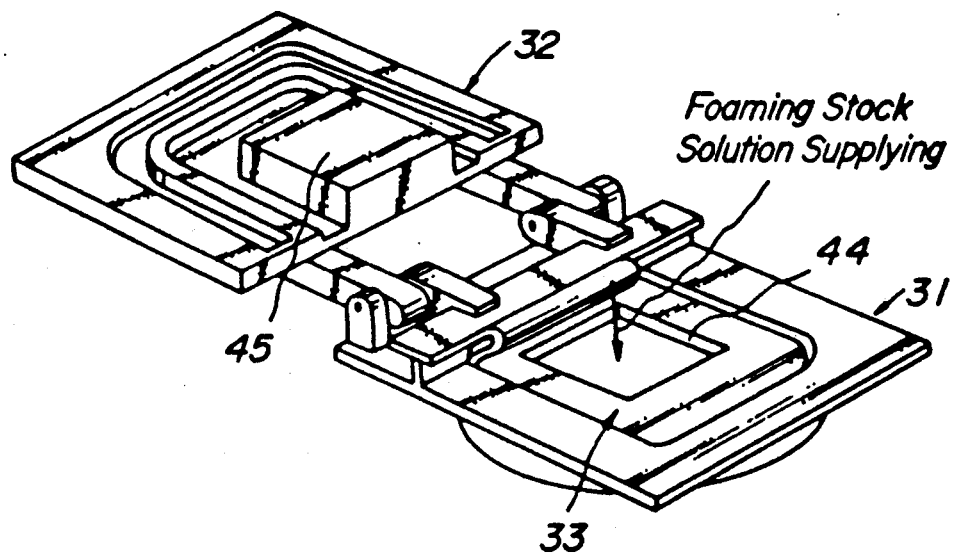
FIG_21
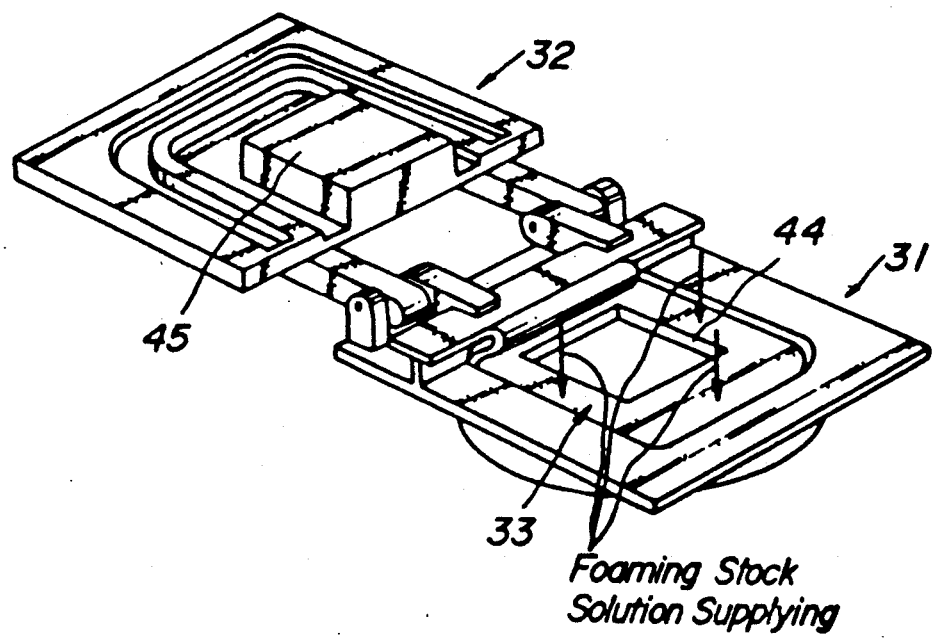

FOAM MOLDING ASSEMBLY

This is a division of application Ser. No. 07/347,135, filed May 4, 1989 now abandoned.

BACKGROUND OF THE INVENTION

This invention relates to a foam molding method and a mold assembly to be preferably used in molding seat pads for seats of vehicles. More particularly it relates to a foam molding method and a mold assembly which enhance aesthetic appearance of rear side pad of a seat back and enable front and rear side pads to be molded from two foaming materials different in characteristics (physical properties provided in JASO-B408 and properties depending upon variance in combination of hot and cold cure foams).

The term "seat pads" used herein is intended to include cushion pads of seats and pads of seat backs.

In a conventional method of producing seat pads for automobiles, for example, a foamed body is molded from a single foaming material and thereafter a foamed body different in characteristics from the first molded foamed body is attached to a principal part of the first molded foamed body.

In another method, as shown in FIG. 1 into a first foaming stock solution 2 proceeding with its foaming in a lower mold 1 a second foaming stock solution is forced. Then the lower mold 1 and an upper mold are closed in a horizontal plane as shown in phantom lines in the drawing and heated and cooled in succession. Alternatively as shown in FIG. 2, a foaming stock solution 5 is poured onto a foamed body 4 previously arranged in a lower mold 1, and an upper mold and the lower mold are closed, heated and cooled. These methods somehow obtain automobile seat pads made of two kinds of foaming materials different in characteristics.

Among these methods, with the method including the step of attaching a foamed body to a previously foamed body, a process for the attaching step is needed to increase a cost of the seat pad. Moreover, there is a risk of unaesthetical appearance due to a positional shift of the attached foamed body relative to the previously foamed body.

In the method of the prior art shown in FIG. 1, the foaming stock solutions of two different kinds cannot be effectively prevented from mixing with each other so that it is very difficult, if not impossible, to realize expected cushion characteristics of the produced seat pad which is poor in reproducibility of quality of the products.

In the method of the prior art shown in FIG. 2, moreover, increase in process and cost caused by the step of setting the foamed body 4 in the lower mold 1 cannot be avoided and impregnated layer of the foamed body 4 with the foaming stock solution 5 detrimentally affect cushion characteristics of the seat pad.

Other than the above described methods of the prior art, there is a method disclosed by the assignee of this application in Japanese Patent Application Laid-open No. 60-240,414.

In this method, there are provided a movable mold rotatable relative to the fixed mold and forming a cavity in cooperation with the fixed mold and a core member forming an inwardly facing flange of a foamed product about a back surface forming member positioned in a center of the movable mold. At least part of the core member is rotatable in upper and lower directions. In foam molding by the use of the mold assembly, after a foaming stock solution is poured into the fixed mold, the movable mold is rotated relative to the fixed mold to close the fixed and movable molds which are then maintained in a substantially horizontal position, thereby causing the foaming stock solution to flow onto a back side of the core member during foaming of the solution to produce a foamed product having the inwardly facing flange on the back surface.

In such a prior art, process however, the foam molding is effected by causing the foaming stock solution poured in the fixed mold to flow onto the back surface side of the core member during foaming of the solution. Therefore, on the inwardly facing flange formed by the function of the core member or on the back surface of the foamed product, marks of flowing of the foaming stock solution would arise due to long flow distances during foaming to detrimentally affect the appearance of the foamed product. In addition, it is substantially impossible to mold front and rear portions of a foamed product from two kinds of foaming materials different in characteristics.

SUMMARY OF THE INVENTION

It is a primary object of the invention to provide a method and a mold assembly for producing foamed products, which eliminate all the disadvantages of the prior art and which considerably enhance aesthetical appearance of foamed products, particularly their rear surfaces and enable foamed products to be made of different kinds of foaming materials on their front and rear sides.

In order to accomplish this object, in a method of molding a foamed product by using a front and a rear mold for molding a front and a rear portion of the foamed product and a core interposed between the front and rear molds, the method according to the invention comprises steps of applying foaming stock solutions onto molding surfaces of the front and rear molds horizontally opened by either of pouring and spraying, and closing said front and rear molds together with said core arranged therein.

In a preferred embodiment, the step of applying the foaming stock solutions onto the molds comprises steps of applying one of the foaming stock solutions onto the molding surface of one mold of the front and rear molds horizontally opened, arranging the core in the one mold and applying the other foaming stock solution onto the core by either of pouring and spraying. In the step of closing said front and rear molds, the other mold is brought onto the one mold to close these molds. Thereafter the closed molds are maintained in a position where an angle of the closed molds relative to a horizontal plane is within a range between 90° and an angle more than 0°.

In another preferred embodiment, the step of applying the foaming stock solutions onto the molds comprises steps of applying one of the foaming stock solutions onto the molding surface of one mold of the front and rear molds horizontally opened, arranging the core in the one mold and applying the other foaming stock solution onto the other mold horizontally positioned. After being closed, the molds are maintained in a position where an angle of the closed molds relative to a horizontal plane is within a range between 90° and an angle more than 0°.

In closing the molds, both the molds may be rotated relative to a horizontal plane or the mold earlier supplied with the foaming stock solution may be brought onto the other mold later supplied with the foaming stock solution.

Moreover, the foaming stock solutions to be poured or sprayed onto the molding surfaces of the molds may be of a single kind or different kinds.

The method according to the invention comprises steps of applying foaming stock solutions onto molding surfaces of the front and rear molds horizontally opened by either of pouring and spraying to cause foaming, and closing the front and rear molds in a position where an angle of the closed molds relative to a horizontal plane is within a range between 90° and an angle more than 0° at a moment when a lapse of time arrives at 30–100% preferably 50–100% of a riser time of a foaming stock solution later applied.

The term "rise time" means a time from a completion of pouring or spraying the foaming stock solutions to a completion of foaming of the solution latest poured or sprayed.

In the molding method, curing of the foaming materials can be effected after closing the molds in the same manner as in the prior art. Particularly, in case of polyurethane of so-called cold cure type, the curing can be effected at a temperature of the order of 60° C.

In a mold assembly for molding a foamed product including a front and a rear mold for a front and a rear portion of the product, respectively, and a core to be interposed between the front and rear molds, according to the invention the front and rear molds are pivotally connected to each other with their one ends by means of a pivot shaft and the core is pivotally supported with its one end by a shaft arranged in parallel to said pivot shaft.

In a preferred embodiment, a gate-frame is pivotally supported by the pivot shaft and the shaft connected to the core is supported by the gate-frame or the shaft connected to the core is the pivot shaft of the molds. Moreover, the core is formed with a through-hole and the rear mold is provided with a protrusion to be hermetically fitted in the through-hole of the core.

According to the foam molding method, foaming stock solutions for a front and a rear portion of a foamed product are separately poured or sprayed onto molding surfaces of the respective molds or the core, so that flowing lengths of the foaming stock solutions for forming the respective portions of the foamed product are sufficiently shortened. This makes very smooth surfaces of the product, particularly its rear surface to greatly enhance its aesthetical appearance.

In the method, the foaming stock solutions are separately poured or sprayed. Therefore, it is possible to use foaming stock solutions of different kinds so that the foamed product can be constituted by foaming materials of two kinds different in characteristics, thereby enabling respective parts of the foamed product to have respected physical properties.

According to the invention, therefore, a foamed product made of two different foaming materials can be very easily produced with low cost without setting an already made foamed body in the molds or without attaching foamed bodies to each other. Moreover, appearance of the foamed product can be effectively improved.

According to the invention, moreover, closing the molds is effected at a moment when a lapse of time arrives at 30–100% of a rise time of the foaming stock solution later applied, so that leakage of the foaming stock solutions in closing the molds can be sufficiently prevented and mixing and diffusion of the foaming stock solutions can be effectively prevented. As a result, foamed products having expected cushion characteristics can be always produced without fail.

As closing the molds is effected in a position where an angle of the closed molds relative to a horizontal plane is within a range between 90° and an angle more than 0°, gases produced from the foaming stock solutions can be smoothly exhausted, thereby making very smooth foamed surfaces of the foamed product and effectively preventing flashes or fins produced at parting surfaces of the molds.

The mold assembly according to the invention is able to pivotally rotate about the pivot shaft after pouring or spraying foaming materials of different kinds onto opened front and rear molds to bring about the molds together with the core therein into the closed position. Thereafter, heating and forming the foaming materials are effected. In another embodiment, after pouring or spraying one foaming material onto the molding surfaces of one mold, the core is pivotally rotated to be set in the one mold. A foaming material of a kind the same as or different from that of the foaming material earlier supplied is poured or sprayed onto the core. Thereafter, the core is covered by the other mold brought onto the core by being pivotally rotated about the pivot shaft to close the molds. Heating and forming the foaming materials are then effected. In a further embodiment, after supplying one foaming material onto the core previously set in the front mold and the other foaming material onto the front mold through the through-hole of the core in a predetermined sequence, the front and rear molds are closed to form a cavity for molding and hermetically close the through-hole by the protrusion provided on the rear mold simultaneously. Thereafter, heating and forming the foaming materials are effected in a suitable pose of the molds to obtain an expected foamed product.

With the mold assembly according to the invention, the foaming stock solutions for front and rear portions of the foamed product can be separately pored or sprayed onto the respective molds or one mold and the core. Thus front and rear portions of the foamed product can be made of foaming materials different in characteristics, and flowing lengths of the foaming stock solutions for molding can be sufficiently shortened to enhance the aesthetical appearance of the foamed product, particularly its rear portion.

The invention will be more fully understood by referring to the following detailed specification and claims take in connection with the appended drawings.

BRIEF DESCRIPTION OF THE DRAWINGS

FIGS. 1 and 2 are sectional views illustrating by way of example of methods of the prior art;

FIGS. 8 to 11, 12 to 15 and 16a to 16d are drawings exemplarily illustrating steps of the invention;

FIGS. 19 to 21 are perspective views illustrating molding processes of the invention using the mold assembly shown in FIG. 18.

DETAILED EXPLANATION OF PREFERRED EMBODIMENTS

Figure 3:
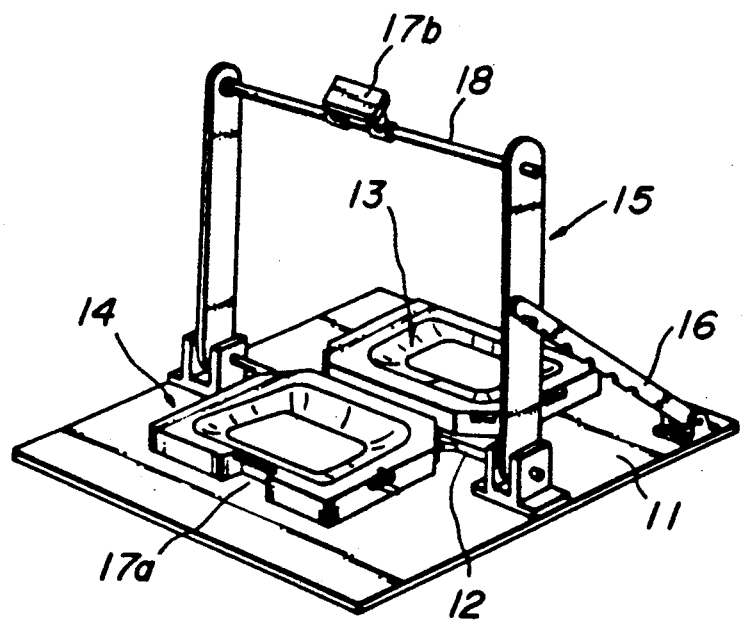
FIG. 3 is a perspective view of one example of a foaming mold assembly to be used in carrying out the method of the invention.

FIG. 3 illustrates a foaming mold by way of example to be used in carrying out one embodiment of the invention. This foaming mold is used for molding seat pads of automobiles.

A front mold 13 for molding a front portion of a seat pad and a rear mold 14 for molding a rear portion of the seat pad are interconnected with their one ends to each other through a bracket (not shown) by means of a pivot shaft 12 extending at a center of a base 11. A gate frame 15 is positioned above the pivot shaft 12 whose ends pivotally support lower ends of the gate frame 15. A stay bar 16 is provided having one end pivotally connected to the base 11 and the other end engageable with one leg of the gate frame 15 for enabling an inclined angle of the gate frame 15 relative to the base 11 to be adjusted.

The rear mold 14 is formed in its free end with a vent gate 17a communicating with molding surfaces and is adapted to be closed, as the case may be, by a closure member 17b rotatably supported by a frame rod 18 of the gate frame 15.

In this embodiment, moreover, instead of the stay bar 16 for adjusting the inclined angle of the gate frame 15, a ratchet mechanism or other support means may be provided to be detachable from the lower end of the gate frame 15. The vent gate 17a may be provided in a free end of the front mold 13.

In molding an automobile seat pad according to the foam molding method of the invention, the front and rear molds 13 and 14 are arranged horizontally opened and foaming stock solutions different in characteristics are poured or sprayed onto molding surfaces of the front and rear molds 13 and 14 to cause their foaming. When the lapse of time arrives at a moment 30-100% preferably 50-100% of rise time of the foaming stock solution later supplied, the front and rear molds 13 and 14 are pivotally raised from the horizontal about the pivot shaft 12 to be closed together into a position where the angle of the closed molds relative to a horizontal plane is within a range between 90° and an angle more than 0°.

Figure 4A:
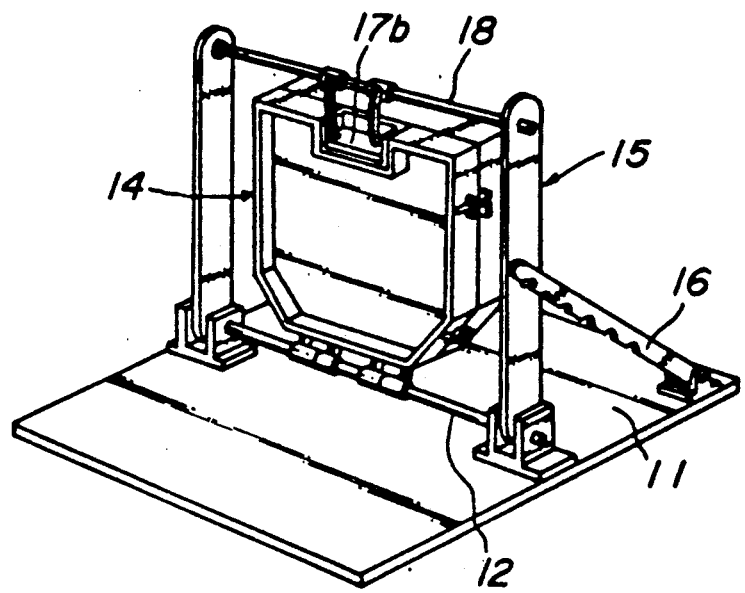
FIGS. 4a and 4b are perspective views exemplarily illustrating positions of the closed molds.
Figure 4B:
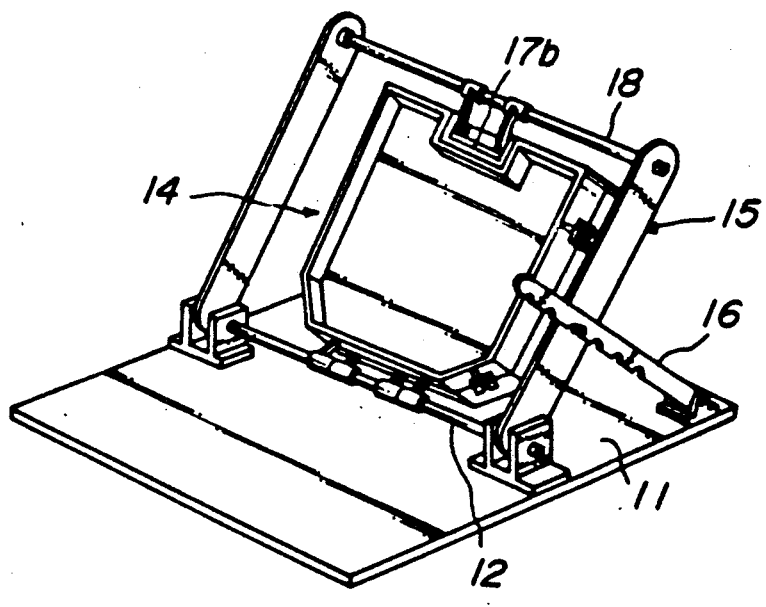

A position of the closed molds relative to the horizontal may be so selected as to enable both the foaming stock solutions to flow most easily in consideration of respective configurations of the molding surfaces of the front and rear molds and others. For example, the closed molds may be brought into a vertical position as shown in FIG. 4a or into an inclined position at an angle θ relative to the horizontal.

In the embodiment shown, the position of the closed molds as above described may be maintained by fitting of the closure member 17b in the vent gate 17a. In case the moment when the front and rear molds 13 and 14 have been closed is different from the moment when the closure member 17b has been fitted in the vent gate 17a, it is preferable to provide a further restraining member adapted to be engaged with and disengaged from at least one of the front and rear molds and to maintain it at an angle substantially the same as an angle of the gate frame 15 relative to the base 11.

After the front and rear molds 13 and 14 have been closed in this manner, the closed molds are caused to pass through a heating furnace (not shown) to bring about reaction of the foaming stock solutions which have proceeded with foaming. Thereafter, the molds are cooled and opened in succession and finally a foamed molded seat pad is removed from the molds.

According to the method of the invention above described, it is possible to produce a seat pad made of two foaming materials different in characteristics and having not only a desired configuration and dimensions but also expected cushion characteristics by pouring or spraying the foaming stock solutions onto molding surfaces of the respective molds 13 and 14 without attaching foamed bodies or setting foamed bodies onto molds. Therefore, according to the invention producing processes and cost of the seat pad are considerably decreased in comparison with those of the prior art, and unaesthetical appearance of the seat pad due to relative shifting of the two foamed bodies is completely prevented.

According to the invention, both of the molds 13 and 14 are closed at the moment when the lapse of time from the pouring or spraying of the respective foaming stock solutions onto the molds 13 and 14 arrives at 30-100% of the rise time of the foaming stock solution later supplied, thereby securely preventing leakage of the foaming stock solutions in closing the molds, mixing of the foaming stock solutions, diffusion of one foaming stock solution into the other and the like. Therefore, seat pads having the expected cushion performance can be repeatedly produced. In the case that the molds are closed substantially at the moment 100% of the rise time of the foaming stock solution, the boundary between the foaming materials can be controlled in the expected manner.

Such control of the boundary between the foaming materials can be carried out more easily in the following manner. After supplying one foaming stock solution to one mold, for example, a non-impregnating film or a mesh is arranged on the foaming stock solution and thereafter the mold and the other mold having been supplied with a foaming stock solution are closed together.

In addition, according to the invention the position of the closed molds is accomplished by upwardly pivotally moving the front and rear molds 13 and 14. Therefore, exhaust of gases produced from the foaming stock solutions and flowing of the foaming stock solutions in the molds can be effected more smoothly than in the prior art closing molds in a horizontal position. Therefore, smooth surfaces of the foamed pads are obtained and flashes or fins extending between parting surfaces of the molds are effectively prevented.

According to the invention, moreover, the cure of the foaming materials is effected in the molds 13 and 14 maintained in the position above described. Thus the number of vent holes formed in the molds is greatly reduced in comparison with that of the prior art. Therefore, protrusions and waste of a molded pad produced at locations corresponding to the vent holes are considerably reduced.

Figure 5A:
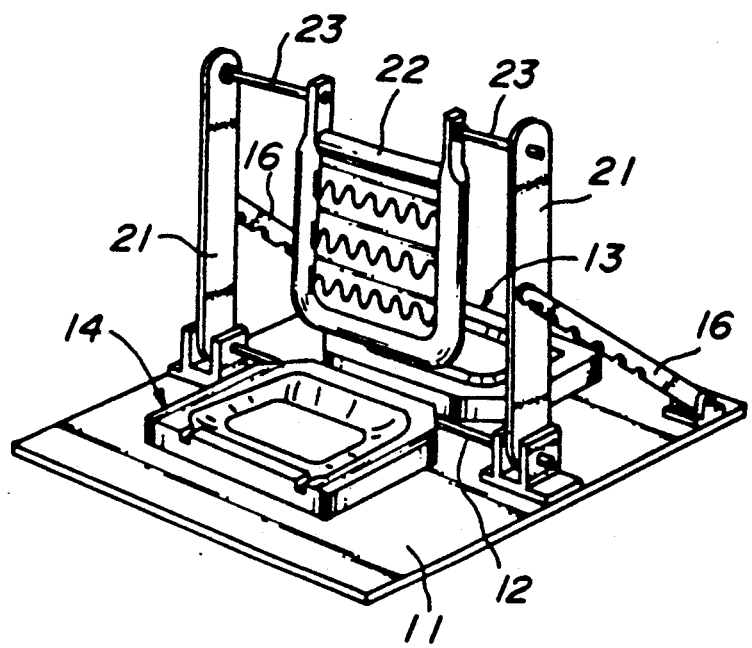
FIGS. 5a and 5b are perspective views of other forming mold assemblies to be used in carrying out of the method of the invention.
Figure 5B:
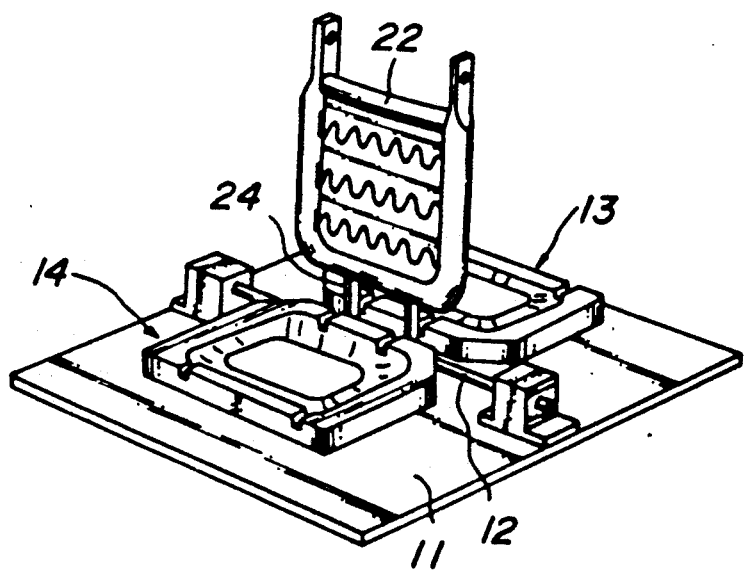

FIGS. 5a and 5b illustrate other foaming molds to be used in carrying out the method according to the invention. In FIG. 5a, a pivot shaft 12 is connected to one ends of two columns 21 to which is detachably secured through support pins 23, a frame 22 to be embedded in a seat pad. In FIG. 5b, a frame 22 to be embedded in a seat pad is secured through support pins 24 to a pivot shaft 12. With foaming molds shown in FIG. 5b, inclined angles of the support pins 24 and hence the pivot shaft 12 for fixedly supporting the support pins 24 are determined by means of hooks adapted to engage in apertures formed in the support pins 24, thereby suitably selecting poses of the closed molds.

The molding by the use of these molds is carried out in the same manner as above described. The molds shown in FIGS. 5a and 5b can bring about functions and effects the same as those above described. Moreover, after the completion of molding, a seat cushion having the frame 22 embedded in the boundary between two foamed materials different in characteristics can be obtained.

As can be seen from the above explanation, according to the invention, a foamed product made of two foaming materials different in characteristics can be produced inexpensively with less processing. Moreover, the aesthetic qualities and cushion performance of the foamed product can be considerably improved, and products equal in inside and outside quality can be repeatedly produced.

Figure 6:
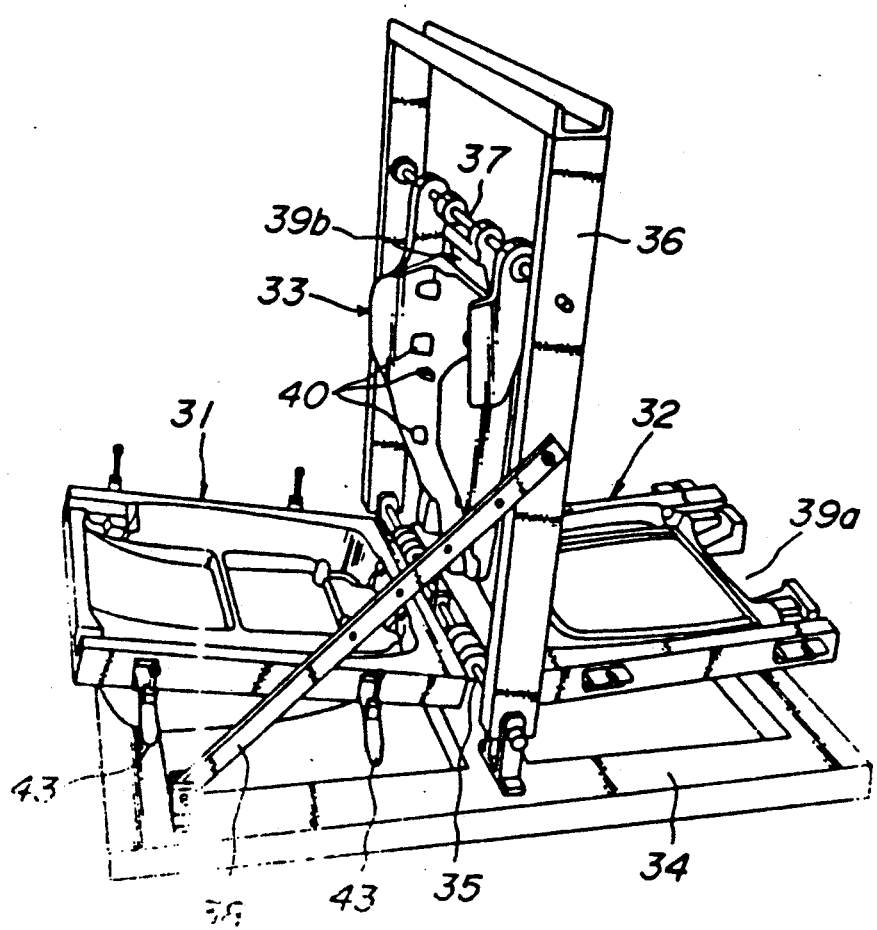
FIG. 6 is a perspective view of a further mold assembly to be used in carrying out of the method of the invention.
Figure 7:
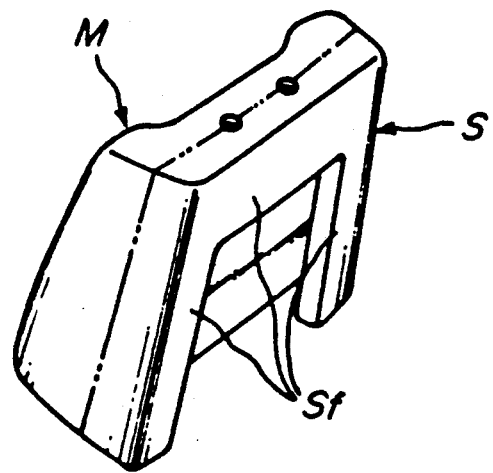
FIG. 7 is a perspective view illustrating a seat back as one example of foamed products.

FIG. 6 illustrates in perspective view other molds to be used for carrying out the method according to the invention.

The foaming molds shown in FIG. 6 are to be used for producing a seat back for an automobile seat. The seat back to be formed consists of a comparatively soft main pad M forming a seat back and a comparatively hard safety pad S positioned on a rear side and forming a space for receiving a seat back frame extending toward a back surface of the main pad M. For the purpose of forming such a seat back, the foaming molds consist of a front mold 31 for forming the main pad M, a rear mold 32 for forming an outer contour of the safety pad S and core 33 for forming an inwardly facing flange $S_f$ of the safety pad S.

Referring to FIG. 6, the front and rear molds 31 and 32 are interconnected with their one ends for forming an upper portion of the seat back SB by a pivot shaft 35 through a bracket. A gate frame 36 is arranged above the pivot shaft 35 and pivotally connected to ends of the pivot shaft 5. On the other hand, the core 33 is pivotally connected with its one end to the gate frame 36 by means of a shaft 37 horizontally extending and provided at a suitable level on the gate frame 36.

In FIG. 6, reference numeral 38 denotes a stay bar 38 for adjusting inclined angles of the gate frame 36 relative to a base 34. The stay bar 38 may be replaced with a ratchet mechanism or other suitable support means secured to the base 34 and detachable from a ratchet wheel provided on the pivot shaft 35.

In this case, it is preferable that in a free end of either of the molds (the rear mold 32 in this embodiment) is provided a gate 39a communicating with molding surfaces. The gate 39a is closed and opened by a closure member 39b pivotally connected to the shaft 37 so as to make the possible required gas vent and pouring of foaming materials as the case may be.

It is further preferable that the core 33 is provided in its front surface facing to the front mold 31 with protrusions 40 for forming through-apertures in the main pad M. Moreover, protrusions 40 also serve as positioning means for spring supporting members, such as hair felt, Victoria lawn and the like embedded in the main pad M.

Figure 8:
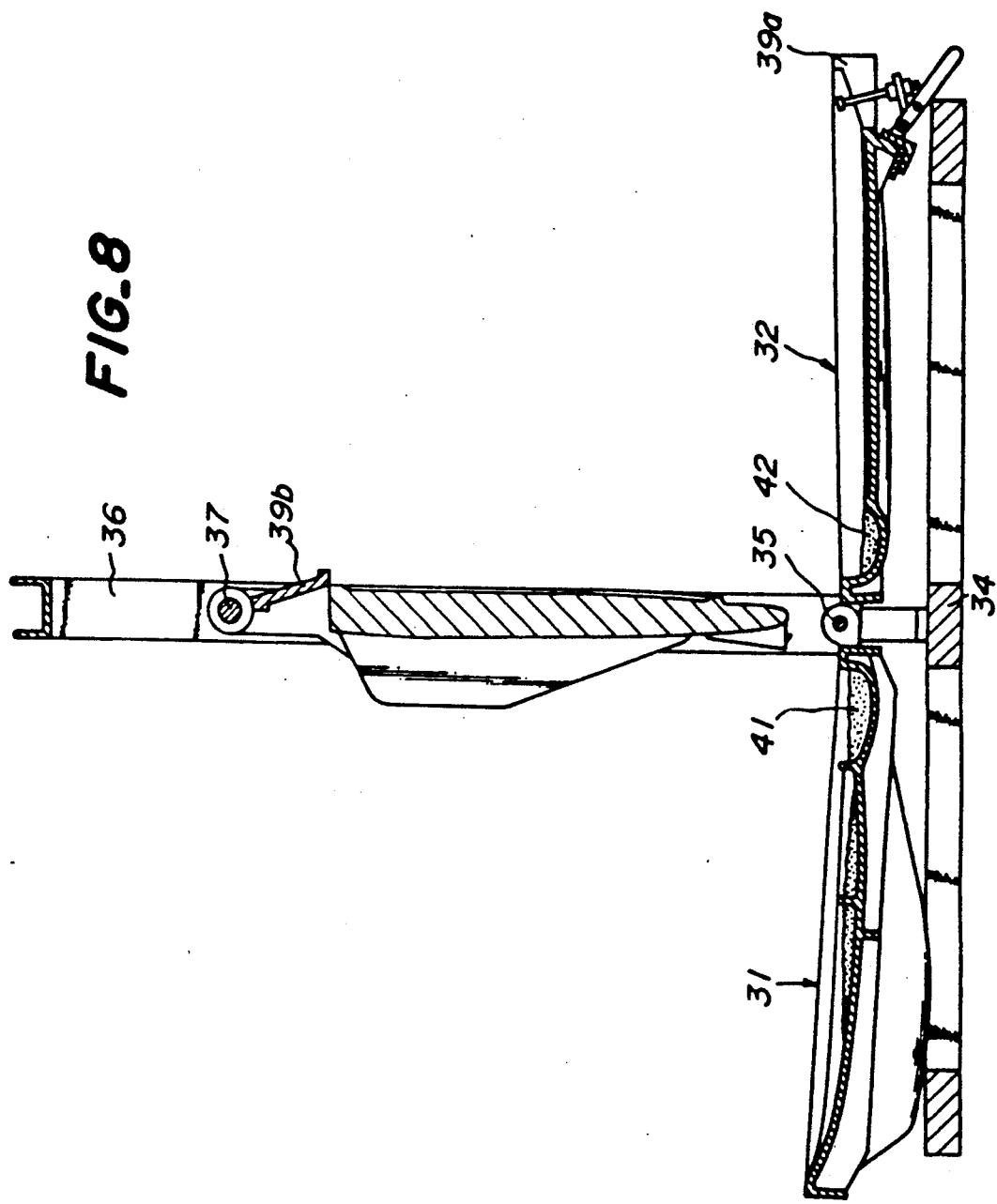

In foam molding using the molds now described, a parting agent is coated on the molding surfaces of the front and rear molds 31 and 32. The molds 31 and 32 are then cooled or heated to a temperature within a predetermined temperature range (for example, 30–40° C. for a so-called hot cure type polyurethane and 50–60° C. for a cold cure type polyurethane). The molds 31 and 32 under the cooled or heated condition are opened in a horizontal plane as shown in FIG. 6 and foaming stock solutions 41 and 42 of the same or different kinds are poured or sprayed onto molding surfaces of the mold 31 and 32 substantially simultaneously or in a predetermined sequence as shown in FIG. 8. The front and rear molds 31 and 32 having the core 33 received therein are closed with the aid of clamping members 43 at a moment when the lapse of time arrives preferably at 30–100% of the rise time of the foaming stock solutions 41 and 42.

Figure 9:
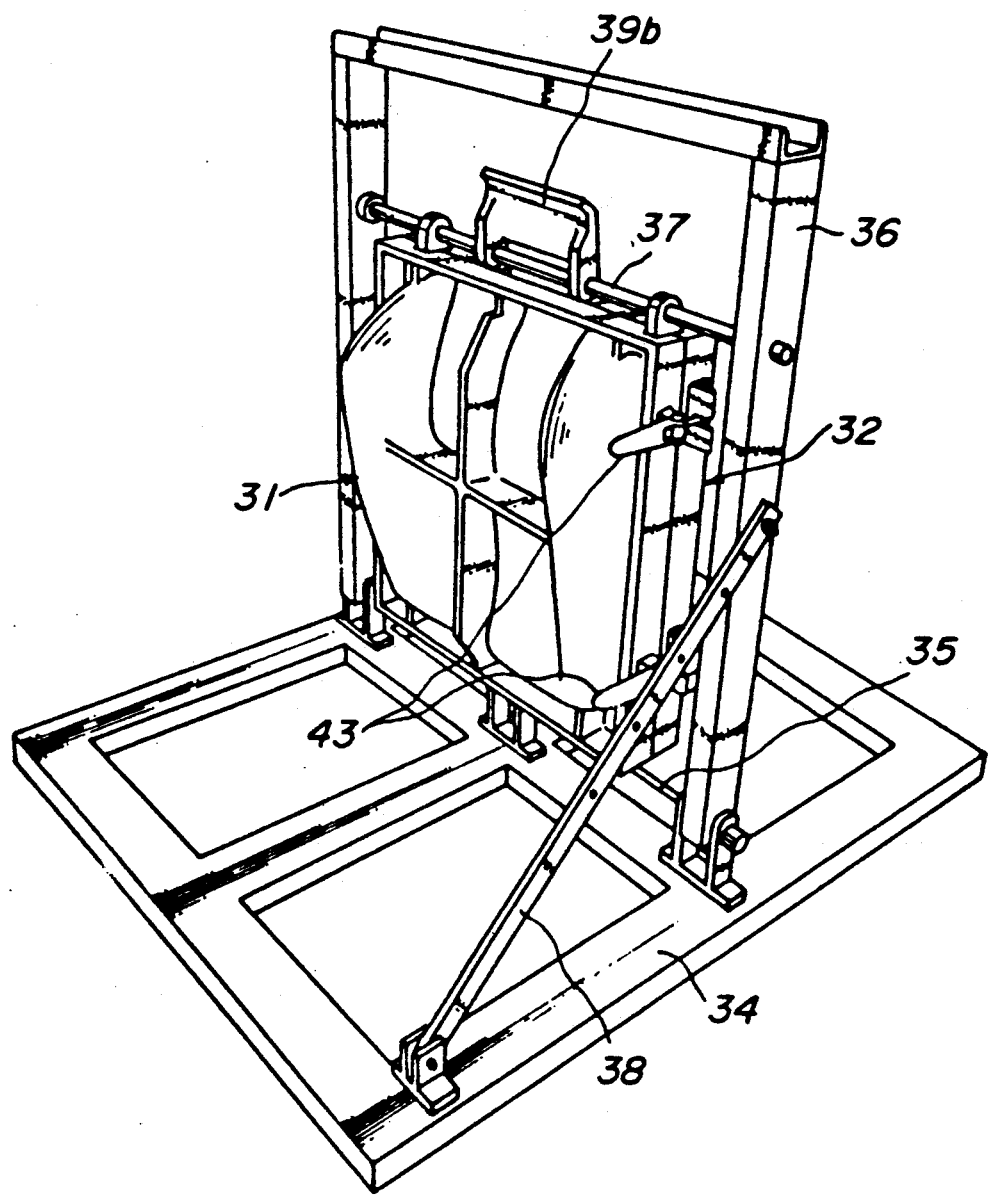

Such a closing of the molds including the core can be effected in a vertical position of the molds 31 and 32 as shown in FIG. 9. As an alternative, the closing may be effected in a sequence in a manner that the core 3 is arranged in the one mold on which is then located the other mold. In such a closed condition, gases resulting from foaming stock solutions 41 and 42 continuing their foaming are exhausted through vent holes formed in at least one mold and/or through the gate 39a. In the case that the gases are exhausted through the opened gate 39a, the gate 39a should be closed by the closure member 39b immediately before the forming solutions are about to flood at the gate 39a or when a cavity filling rate arrives at 95–99%.

Thereafter, the foaming materials are cured in the molds in the horizontal position or in a position where the angle of the closed molds relative to a horizontal plane is within a range between 90° and an angle more than 0°. In case of the hot cure type polyurethane, the molds are heated in the most cases at 160–230° C. for 10–15 minutes. On the other hand, with the cold cure type polyurethane, the molds are usually heated at 50–80° C. for 4–8 minutes.

Figure 10:
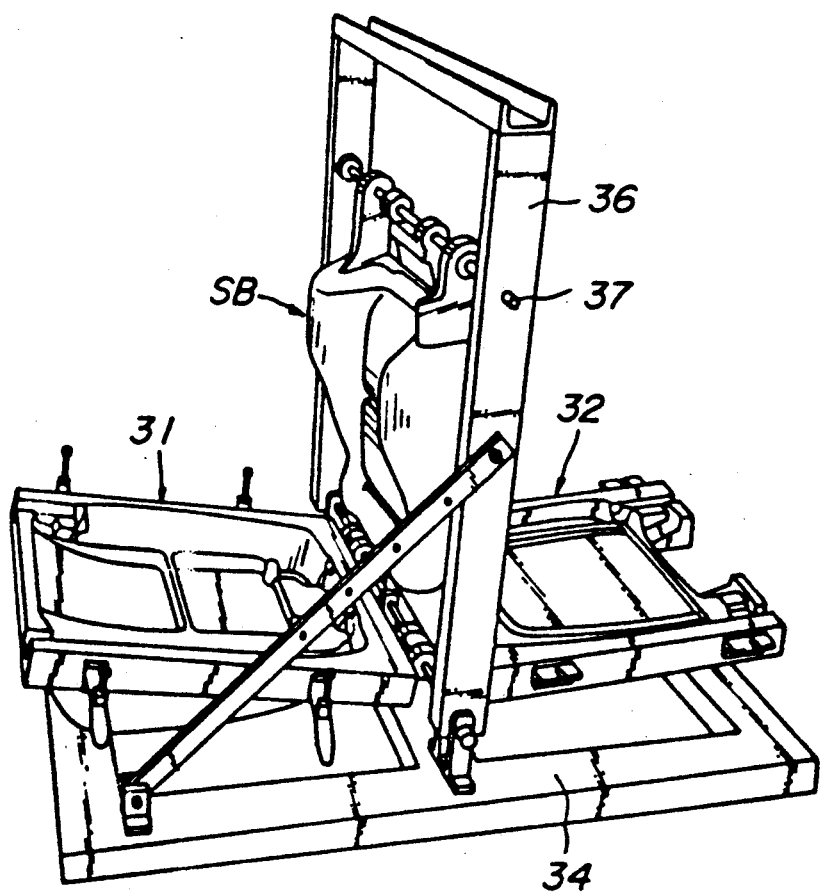
Figure 11:
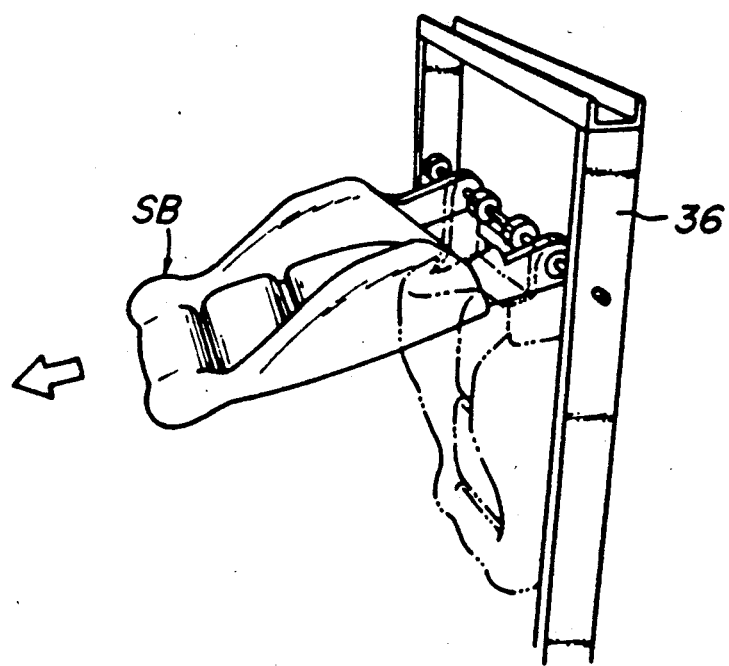

After a seat back has been formed in this manner, the molds are cooled if required and opened as shown in FIG. 10. Finally, the seat back SB remaining on the core is removed therefrom with the core 3 in a rotated position about the shaft 7 as shown in FIG. 11 or in a rotated position on an opposite position to that shown in FIG. 11. A series of operations for forming the foamed product has been completed in this manner.

According to the invention as above described, the foaming stock solution 41 for forming the main pad of the seat back SB and the foaming stock solution 42 for forming the safety pad are separately poured or sprayed onto the molding surfaces of the molds 31 and 32. Therefore, flowing distances required to the foaming stock solutions can be sufficiently shortened so that marks of flowing of the foaming stock solutions are completely eliminated from molded surfaces of the seat back SB, particularly its safety pad to greatly enhance the aesthetic quality of the safety pad S. In addition, it is possible to use lower inner pressure of the molds so that defects such as cracks, voids and the like are effectively prevented.

In molding according to the invention, when the foaming stock solutions 41 and 42 are of different kinds, the main pad M and the safety pad S can be formed from two kinds of foamed materials of different in characteristics so that expected characteristics can be given to the respective pads and hence the seat back SB.

Therefore, even after the seat back SB is covered by a woven fabric or other cover material, the aesthetical appearance, particularly viewed from the rear side can be advantageously improved.

In the method according to the invention, moreover, since the foaming stock solutions 41 and 42 can be simultaneously poured or sprayed onto the molds 31 and 32, the time from the start to the end of pouring or spraying can be sufficiently shortened so that a length of a production line is also effectively shortened.

In addition, according to the invention after the foaming stock solutions 41 and 42 have been poured or sprayed onto the molds 31 and 32, the molds embracing the core are immediately closed so that the processes to finish of the closing of the molds can be considerably simplified.

In case that gases produced in foaming of the foaming stock solutions are exhausted through the gate 39a. Moreover, protrusions and waste of a molded pad produced at locations corresponding to the vent holes are considerably reduced, and decrease in weight of the molded seat back SB can be effectively prevented.

Moreover, since the closing of the molds is effected at the timing of 30-100% of the rise time of the foaming stock solutions 41 and 42, boundaries between the foamed materials are smooth in case particularly using foaming stock solutions of different kinds.

Figure 12:
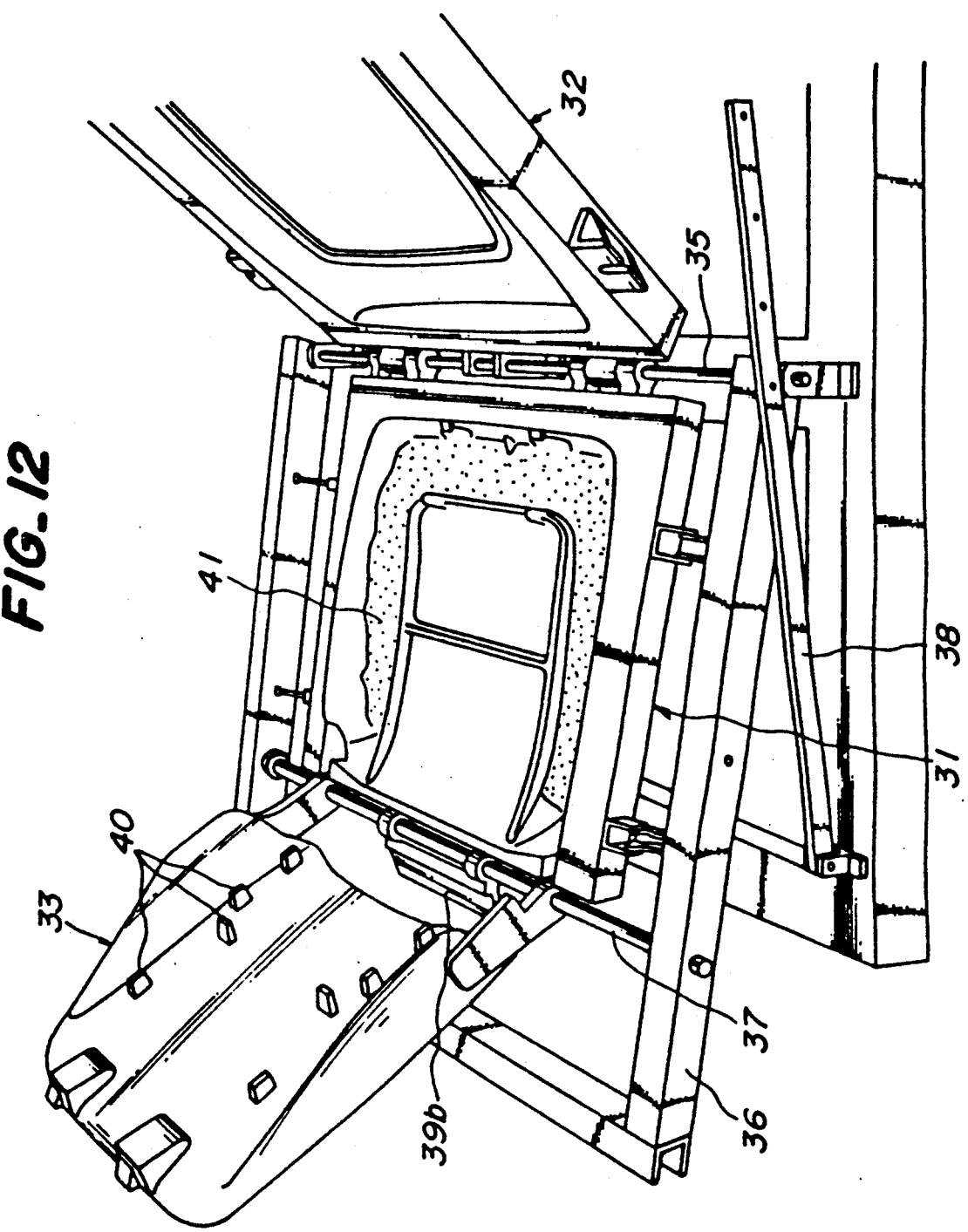
Figure 13:
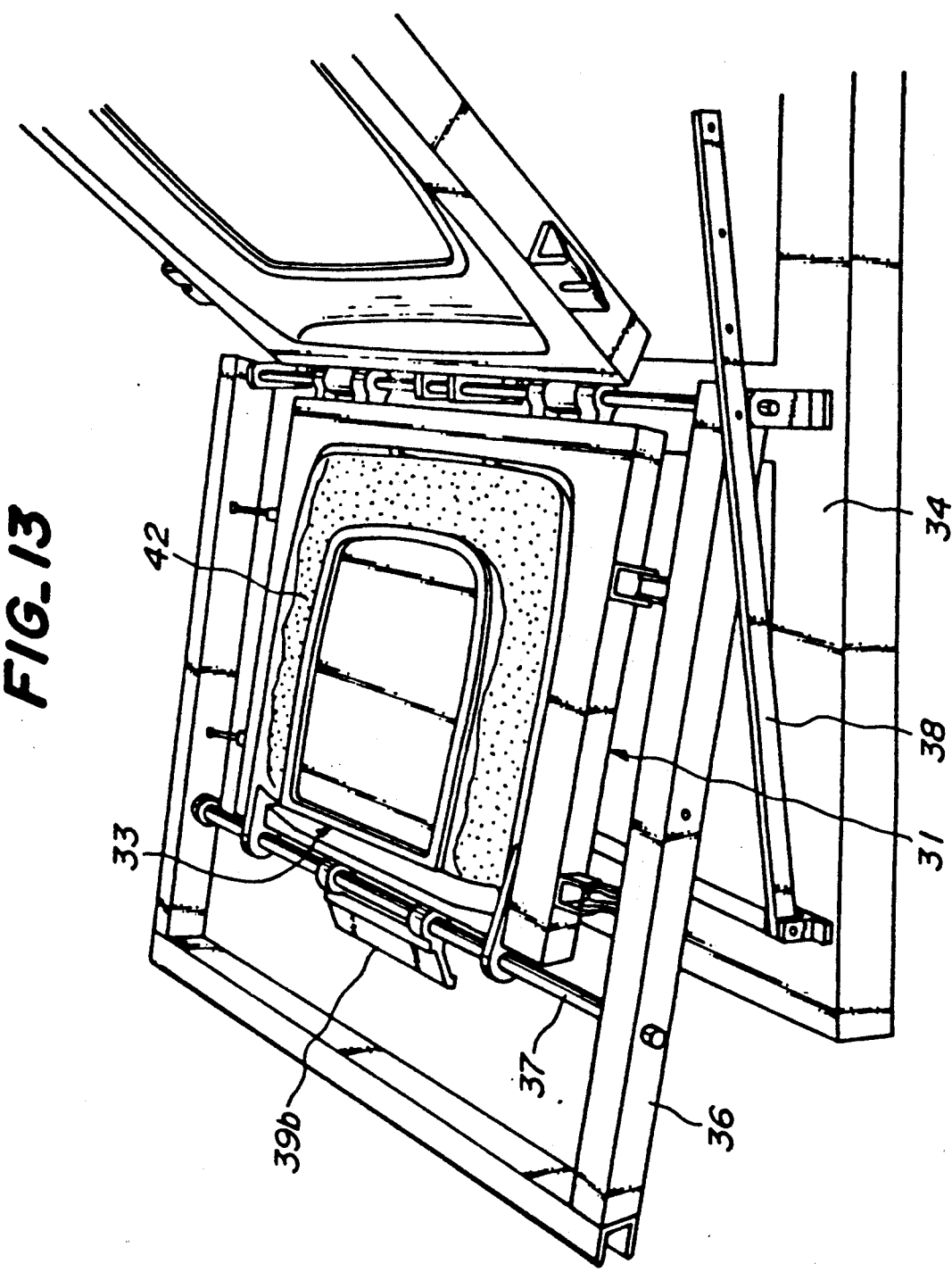
Figure 14:
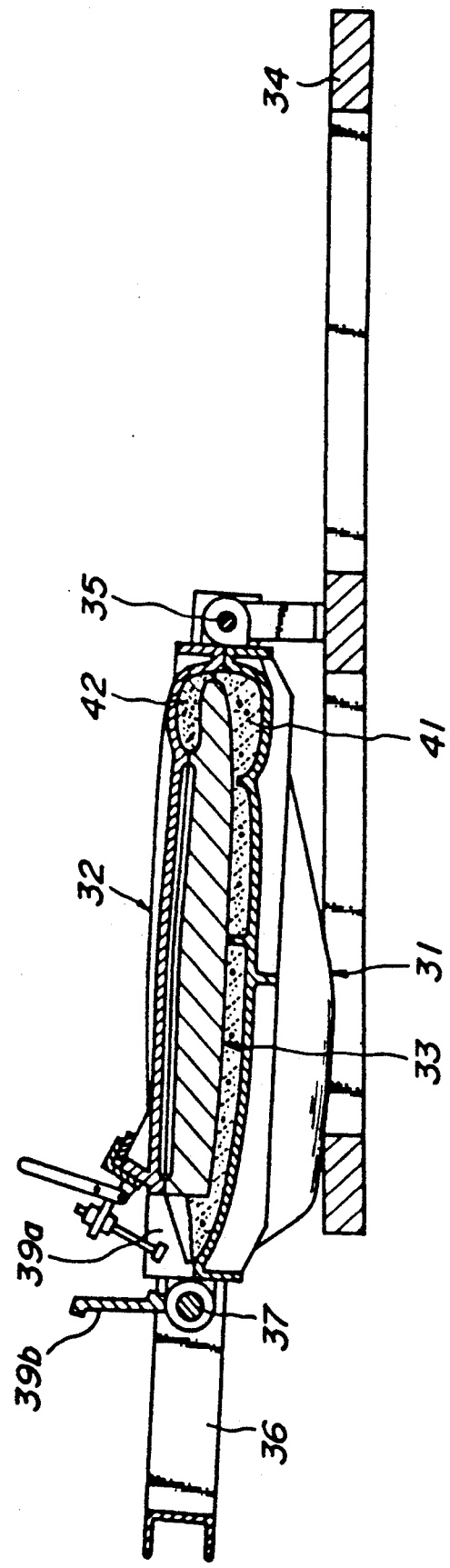

In a modification of the method shown in FIG. 12, after a foaming stock solution 41 is poured or sprayed onto either of the molds (a front mold 31 in this embodiment), a core 33 supported through a shaft 37 by a gate frame 36 is arranged on the front mold 31 and then a foaming stock solution 42 is poured or sprayed onto the core 33 as shown in FIG. 13. As shown in FIG. 14, moreover, a rear mold 32 is arranged on the front mold 31 and these molds are then closed. Thereafter, both the molds 31 and 32 are maintained in a position where the angle of the closed molds relative to a horizontal plane is within a range between 90° and an angle more than 0°, for example, shown in FIG. 9 to effect the curing of the foaming materials.

In this case, moreover, exhaust of gases produced after closing the molds is carried out through vent holes (not shown) and/or a gate 39a as in the similar manner to that above described.

According to this method, moreover, the foaming stock solution 42 may be poured or sprayed onto the rear mold 42 and then the core 33 and the front mold 31 may be arranged in succession onto the rear mold 42.

In the molding method, the respective foaming stock solutions 41 and 42 are separately poured or sprayed onto molding surfaces and the core. Therefore, marks of flowing of the foaming stock solutions are eliminated in the same manner as in the preceding embodiment, so that aesthetical appearance of the safety pad S and hence the seat back SB can be greatly improved and respective parts of the seat back can be formed from the foamed materials having required characteristics.

In this case, moreover, the pouring or spraying of the foaming stock solutions 41 and 42 can be effected only on one side of the pivot shaft 35, so that one or two foaming machines can be arranged only one side of the pivot shaft 35, with the result that the space to be occupied by the apparatus can be advantageously reduced.

In this case, furthermore, the foaming stock solution is not supplied to one mold which will be brought onto the other mold, so that leakage of the foaming stock solutions in closing the front and rear molds 31 and 32 can be completely prevented.

According to the invention, moreover, since the position of the closed molds is upwardly directed from the horizontal or in the position where the angle of the closed molds relative to a horizontal plane is within a range between 90° and an angle more than 0°, flashes or fins between parting surfaces of the molds are considerably reduced in comparison with the prior art. Moreover, the exhaust of gases produced in foaming of the foaming materials can be smoothly carried out and defects caused by the gases in the proximity of the parting surfaces of the molds 31 and 32 can be substantially completely eliminated.

With the foaming molds shown in the drawings, moreover, as the gate frame 36 can be suitably inclined relative to the base 34, the foaming molding of the seat back can be carried out in the same manner as above described with the molds being maintained in a required inclined position. Therefore, the heating furnace for receiving the foaming molds can be made smaller in comparison with those of the prior art.

Moreover, the foaming molding operation can be effected in the following manner. After the gate frame 36 is brought down completely onto the front mold side and supported by the base 34, the foaming stock solution 41 is supplied onto the molding surface of the front mold 31. The core 33 is then brought down completely onto the wall of the front mold as shown in FIG. 14 and the foaming stock solution 42 is supplied onto a predetermined area on the core 33. Thereafter, the rear mold 32 is brought down onto the core 33 as shown in FIG. 15 and both the molds are closed. The required gas vent is effected through the gate 39a and the gate 39a is closed by the closure member 39b in succession. The foaming materials 41 and 42 in the molds maintained in a required position are heated to form a seat back to be produced. With the method, the functions and effects above described can be brought about in the same manner.

In the prior art, front and rear molds could not be opened to an angle in excess of acute angles. In contrast herewith, the foaming molds according to the invention could be opened into a completely horizontal position or approximately 180°. Therefore, temperature control of the molds and core can be easily effected. For example, cooling after completion of heating can be carried out with the completely opened molds so that the cooling process is effected in a shorter time to improve the working efficiency.

In the method shown in FIGS. 10, 14 and 15, the foaming material 42 may be first supplied onto the molding surfaces of the rear mold 32 and thereafter the foaming material 41 may be supplied onto the core to effect the required foaming molding.

Moreover, the various foaming molding methods as above described can also be carried out with the front and rear molds interconnected by the pivot shaft and the core being pivotally connected directly at one end of either of the molds.

Figure 16A:
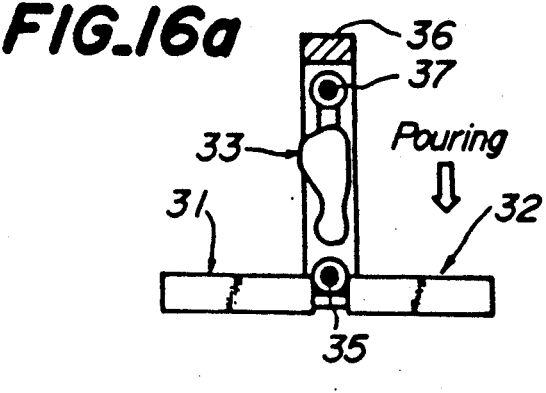
Figure 16B:
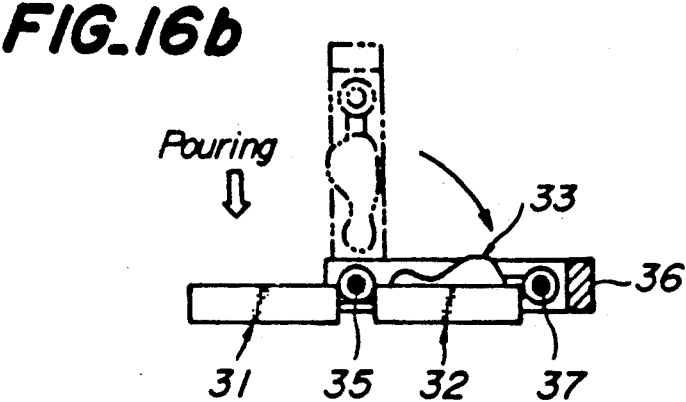
Figure 16C:
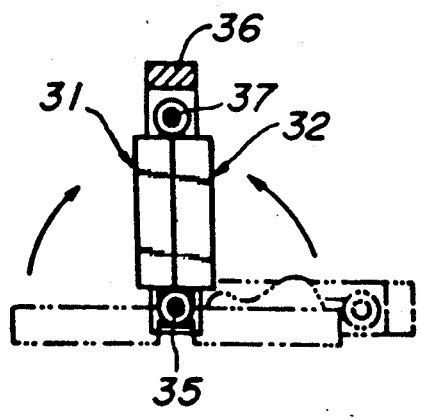

In an embodiment shown in FIGS. 16a-16b, front and rear molds 31 and 32 are arranged in a substantially horizontal position and the foaming stock solution 42 is poured or sprayed onto the molding surface of either of the molds (the rear mold 32 in this embodiment) and a core 33 is arranged on the rear mold 32 as shown in FIG. 16b. Thereafter, the foaming stock solution 41 is poured or sprayed onto the molding surface of the front mold 31 also arranged in the horizontal position. The front and rear molds 31 and 32 are closed in a suitable position or in a vertical position as shown in FIG. 16c when both the foaming states of the respective foaming stock solutions arrive at 50-100% of their rise time or when the forming state of the foaming stock solution 41 later supplied arrives at 50-100% of its rise time and the foaming state of the foaming stock solution 42 earlier supplied has arrived at a state in excess of its rise time and before tack-free time. Thereafter, the curing of the foaming materials is carried out with the molds being maintained in the position where the angle of the closed molds relative to a horizontal plane is within a range between 90° and an angle more than 0°.

In this case, after the foaming stock solution 41 may be first supplied to the front mold 31 and the core 33 may be applied to the front mold 31, the foaming stock solution 42 may be supplied to the rear mold 32.

This embodiment can accomplishes the same functions and effects as those in the previous embodiments or the improved appearance and constitutions of respective parts of the seat back made of foamed materials having required characteristics.

In the method shown, moreover, since the core 33 is arranged upon the rear mold 32 supplied with the foaming stock solution 42, the core 33 serves as an inner cover so that control of thickness of the safety pad S is effected with ease.

When closing of the molds is carried out at the moment when the lapse of time arrives at 50-100% of the rise time of the foaming stock solutions 41 and 42, the control of the boundary between the main pad M and safety pad S becomes easy in conjunction with the fact that the core 33 is arranged on the rear mold 32. This is particularly acute in the case that the closing of the molds is carried out at 50-100% of the rise time of the later supplied foaming stock solution 41 and more than 100% of the rise time of the earlier supplied foaming stock solution 42 and before the tack-free time.

Figure 16D:
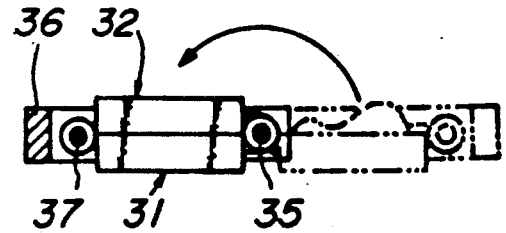

In another method according to the invention, after effecting steps in succession of supplying the foaming stock solution 42 to the rear mold 32, putting the core 33 into the rear mold 32 and supplying the foaming stock solution 41 to the front mold 41 as shown in FIGS. 10a and 10b, the core 33 and rear mold brought onto the front mold 31 as shown in FIG. 16d when the lapse of time arrives at more than 100% of the rise time of the earlier supplied foaming stock solution 42 and before tack-free time. Thereafter, the curing of the foaming materials are effected with the molds maintained in the position where the angle of the closed molds relative to a horizontal plane is within a range between 90° and an angle more than 0°.

This method can of course bring about the same function and effects as those in the previously described and can control the thickness of the safety pad S and boundary between the main pad M and the safety pad S very easily and substantially completely prevent the leakage of the foaming stock solutions in closing the molds.

Figure 17:
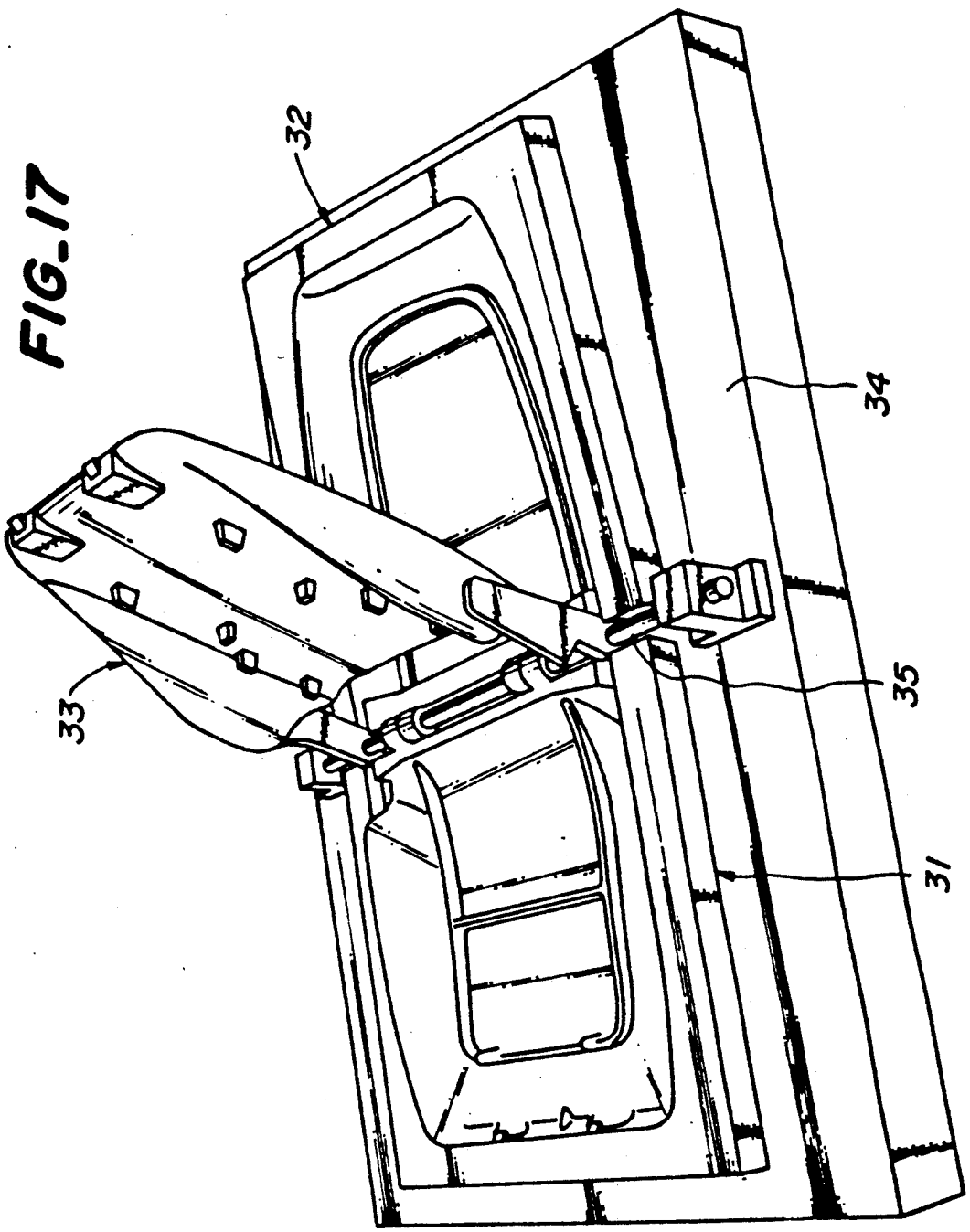
FIGS. 17 and 18 are perspective views exemplarily illustrating other mold assemblies to be used in carrying out of the invention.

Although the invention has been explained typically using the molds shown in FIG. 6, the invention can be carried out in a manner as shown in FIG. 17. As shown in FIG. 17, an end portion of either of front and rear molds 31 and 32, preferably both end portions of the molds serving to form a lower portion of the seat back are interconnected through brackets by means of a pivot shaft 35 provided on a base 35. Moreover, a core 33 is pivotally connected with its one end through brackets to the pivot shaft between the molds. As an alternative, the core may be directly pivotally connected to one end of either of the molds remote from the pivot shaft.

Figure 18:
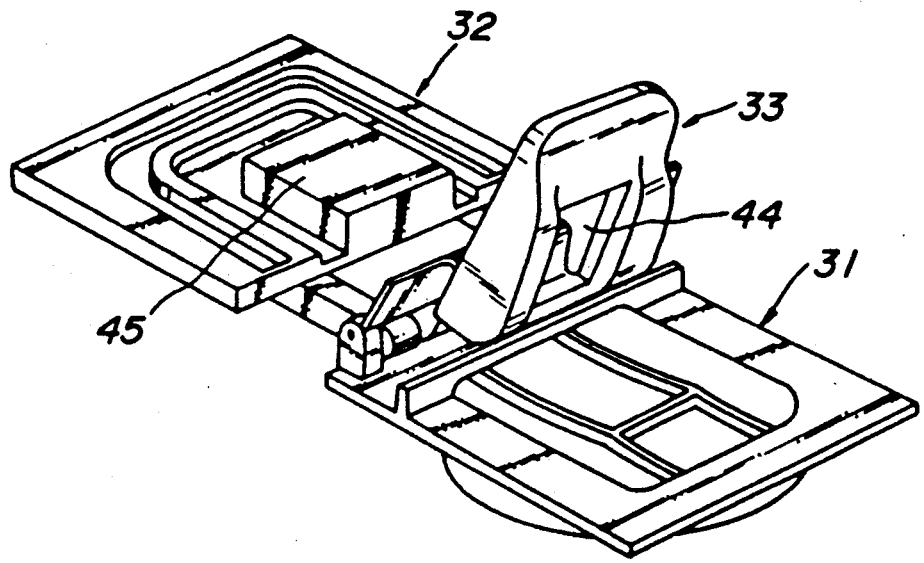

FIG. 18 is a perspective view illustrating another embodiment of the molds shown in FIG. 17. In this embodiment, a core 33 is formed with a through-hole 44 having a required configuration and size in its center or in the proximity of the center. Moreover, the rear mold 32 is provided with a protrusion 45 which is adapted to fit in the through-hole 34 so as to hermetically close it. A wide surface of the protrusion is adapted to smoothly merge with the molding surface of the core 33 for molding the foamed material when in its fitted position within the through-hole 34.

Figure 19:
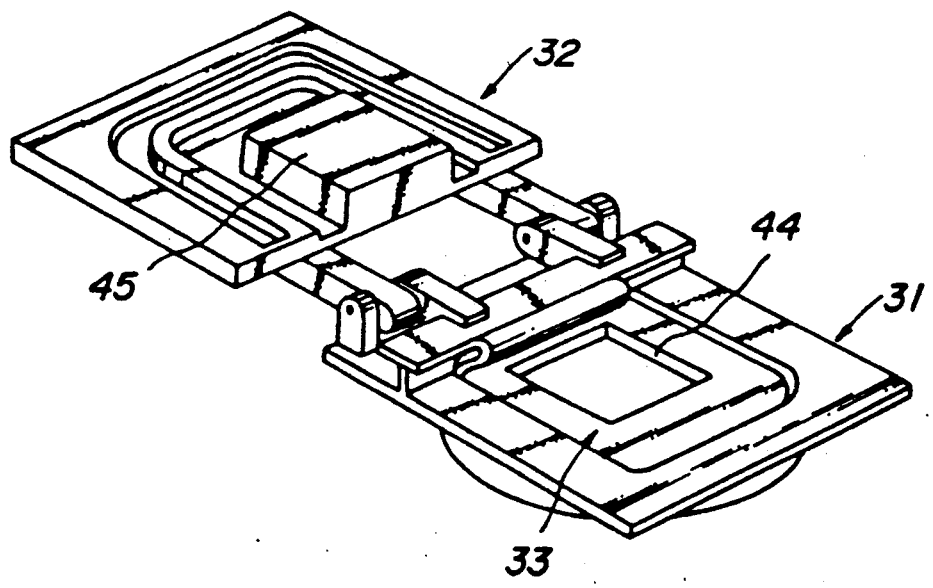

In molding the seat back using the molds, the core 33 is previously set with the aid of rotating movement of itself in the front mold 31 in the horizontal position as shown in FIG. 19. Then the foaming stock solution is supplied through the through-hole 34 into the front mold as shown in FIG. 20 and the foaming stock solution is supplied onto the core as shown in FIG. 21 in succession. Thereafter, the closing of the molds and curing of the foaming materials in the molds in the required position in successive manner, thereby obtaining a required foamed product. In this case, the foaming molding can be carried out in a manner such that after supplying the foaming stock solution onto the core, a foaming stock solution different in kind or of the same kind is supplied on the front mold. According to the embodiment, a seat back SB having inwardly directing flanges $S_f$ on four sides is can be molded without any forming defects on its outer surface regardless of the same or different materials of the main pad M and safety pad S.

Although the foaming molding of the seat back has been explained, the invention can of course be applicable to various kinds of foamed products by modifying molding surfaces of the molds as the case may be.

As can be seen from the above explanation, according to the invention forming solutions for forward and rearward parts of a foamed product are separately poured or sprayed on molding surfaces of the molds or the core so that flowing lengths of the foaming stock solutions for molding respective parts of the foamed product are sufficiently shortened. As a result, it is possible to obtain smoothness of respective molded surfaces and hence aesthetical appearance of the foamed product and effectively reduce the foaming pressure to advantageously prevent cracks, voids and flashes or fins of the foamed product.

In this invention, moreover, in the event the foaming stock solutions separately supplied are of different kinds, the molded foamed product can be composed by two kinds of foamed materials different in characteristics so that respective properties can be given to respective parts of the foamed product.

According to the invention, the curing of the foaming materials is effected with the closed molds maintained in the vertical position or a position inclined away from a horizontal position so that flashes or fins produced between parting surfaces of the molds are considerably reduced in comparison with the prior art effecting the curing with molds in horizontal position. Moreover, gases produced in foaming of forming solutions can be smoothly exhausted out of the molds and defects of foamed products caused by gases remaining in the proximity of the parting surfaces of the molds can be substantially removed.

Moreover, with the molds according to the invention, the foaming stock solutions can be simultaneously supplied onto the core and the front mold and in the case producing a foamed molded body consisting of two kinds of foaming materials, after supplying the foaming stock solution, the foaming stock solution can be supplied onto the front mold with the aid of the through-hole 44.

Thereafter, the rear mold 32 is brought onto the front mold 31 to close these molds so that a required cavity is defined by the molds 31 and 32 and the core 33 and the through-hole 44 is completely hermetically closed by the protrusion 45 provided on the rear mold 32. The respective foaming materials are then heated and molded in the molds in the required position.

Figure 22:
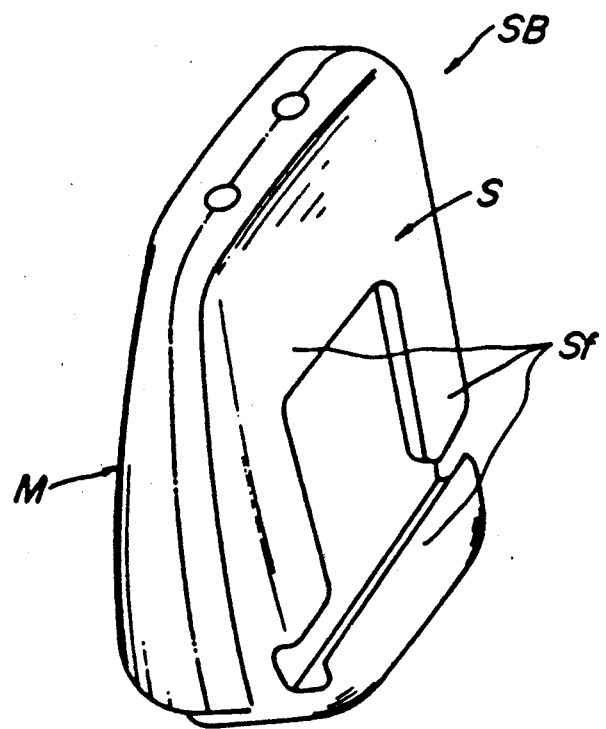
FIG. 22 is a perspective view of a foamed product molded by the mold assembly shown in FIG. 18.

With the molds, required flowing distances of the foaming stock solutions after closing the molds are sufficiently shortened concerned with flowing of the foaming stock solution supplied onto the core, thereby effectively preventing marks of flowing of the solutions on the produced foamed body and other defects thereon resulting from long flowing distances of the solutions. Moreover, by supplying foaming stock solutions of different kinds onto the core and the front mold, the foamed seat back having inwardly directing flanges $S_f$ on four sides can be produced which is composed of a main pad M of a comparatively soft material and a safety pad S of a comparatively hard material as shown in a perspective view of FIG. 22.

Although the foaming molds have been explained by referring to the attached drawings, the molds according to the invention can of course be applicable to production of various kinds of foamed products by modifying molding surfaces of the molds other than the seat back as the case may be. Moreover, the molds according to the invention can of course be used for producing a foamed product made of a foaming material of a single kind.

As can be seen from the above explanation, according to the invention the foaming stock solutions for forming front and rear portions of a formed body are separately and directly supplied into the molds so that the flowing distances of the solutions are sufficiently shortened, thereby obtaining the foamed product having smooth surfaces devoid of bubbles and flowing marks thereon to enhance its aesthetical appearance. Moreover, by using foaming stock solutions of different kinds, physical properties of front and rear portions of the foamed product are modified dependently upon various requirements. Furthermore, according to the invention the front and rear molds can be completely opened into a common plane. Therefore, temperature of the molds can be easily controlled. For example, the molds and core can be easily cooled after completion of one operation and therefore operation efficiency is improved. In addition, by using the molds in vertical positions, a heating furnace for receiving the molds can be made smaller.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A mold assembly for molding a foamed product comprising: a front mold having a mold cavity for retaining a foaming stock solution for a front portion of the product, a rear mold having a mold cavity for retaining a foaming stock solution for a rear portion of the product, a core positioned to be interposed between the front and rear molds, a pivot shaft for pivotally connecting ends of each of front and rear molds, and a shaft pivotally supporting one end of said core, said shaft in parallel to said pivot shaft to pivot said front and rear molds and said core to substantially horizontal positions thereof.

2. A mold assembly as set forth in claim 2, wherein a gate-frame is pivotally supported by said pivot shaft for said front and rear molds and said shaft connected to said core is supported by said gate-frame.

3. A mold assembly as set forth in claim 1, wherein said shaft connected to said core is the pivot shaft of the molds.

4. A mold assembly as set forth in claim 1, wherein said core is formed with a through-hole and said rear mold is provided with a protrusion to be hermetically fitted in said through-hole of the core.

5. A mold assembly as set forth in claim 2, wherein either of the front and rear molds is provided in a free end with a gate in fluid communication with molding surfaces of said mold assembly, and a closure member pivotally connected to the shaft supported by the gate frame to close said gate.

6. A mold assembly according to claim 1 further comprising protrusions on said core, said protrusions providing apertures in said product.

7. A mold assembly according to claim 1 further comprising a frame mounted on said pivot shaft and carrying said shaft supporting said core, a base for mounting said frame, and means for supporting said frame at an angular orientation relative to said base.

* * * * *